United States Patent [19]

George et al.

[11] Patent Number: 5,020,814

[45] Date of Patent: Jun. 4, 1991

[54] COLLAPSIBLE BICYCLE TRAILER

[75] Inventors: Donald A. George; Peter B. Berry; Bruce W. Creps; Geraldine C. Roles, all of Eugene, Oreg.

[73] Assignee: Burley Design Cooperative, Eugene, Oreg.

[21] Appl. No.: 535,705

[22] Filed: Jun. 11, 1990

[51] Int. Cl.$^5$ ............................................. B62K 27/02
[52] U.S. Cl. ...................................... 280/204; 280/401; 296/36
[58] Field of Search ............ 280/202, 204, 401, 415.1, 280/639, 656; 296/14, 36, 40

[56] References Cited

U.S. PATENT DOCUMENTS

| 679,539 | 7/1901 | Nosal | 296/36 |
|---|---|---|---|
| 3,792,875 | 2/1974 | Paden | 280/204 |
| 4,037,853 | 7/1977 | Sparks | 280/204 |
| 4,180,279 | 12/1979 | Belliveau, Sr. | 280/204 |
| 4,721,320 | 1/1988 | Creps et al. | 280/204 |

FOREIGN PATENT DOCUMENTS

| 3214448 | 10/1983 | Fed. Rep. of Germany | 280/204 |
|---|---|---|---|
| 3545709 | 6/1987 | Fed. Rep. of Germany | 280/656 |

*Primary Examiner*—Charles A. Marmor
*Assistant Examiner*—Mitchell Bompey
*Attorney, Agent, or Firm*—John F. Ingman

[57] ABSTRACT

A collapsible bicycle trailer includes a rigid chassis frame, hinged side rails, a side rail locking bar, a hinged tongue, and quick release wheels. The chassis frame has a generally rectangular-shaped outer frame member, and inner frame members spaced inwardly from and parallel to, the sides of the outer frame member, with wheels rotating between the outer and inner frame members. On each side of the chassis frame are positioned a pair of side rail hinge members to which are attached the lower ends of the side rails which rotate between an extended, vertical position and a folded horizontal position. The side rail hinge members also are designed to provide the connecting means between the outer and inner frame members. A side rail locking bar is pivotally attached to the top of one side rail and unfolds to securely connect to the top of the other side rail, forming a roll bar assembly. Extending forward from a front corner of the chassis frame is a tongue, having at its outer end a hitch for attaching the trailer to a bicycle. A pivot shaft is mounted between a side of the outer frame member and an inner frame member to pivotally support the inner end of the tongue, allowing the tongue to be folded 180-degrees to a position beneath and adjacent to the chassis frame. A U-shaped tongue clip, with securing pin penetrating its downwardly extending legs, is installed on the outer frame member to grasp and secure the trailer tongue in an open, extended position.

8 Claims, 4 Drawing Sheets

COLLAPSIBLE BICYCLE TRAILER

BACKGROUND OF THE INVENTION

1. Field of the Invention

This invention involves a bicycle trailer, and, more particularly, a bicycle trailer which is collapsible for storage or transportation.

2. Description of the Prior Art

As bicycling becomes a more popular mode of travel and recreation, more cyclists are using bicycle trailers to take along the children, a picnic basket, camping gear, or even the dog. The conventional bicycle trailer, however is undesirably bulky and unwieldy for storage and for transportation in other vehicles.

Certain foldable trailers have been developed, as disclosed in U.S. Pat. Nos. 4,037,853 and 4,614,352. These trailers include a folding chassis frame where folding of the chassis moves the attached wheels closer together thereby reducing somewhat the lateral dimensions of the trailer. However, such collapsing of the main chassis frame creates apprehension for those who would carry children and prefer a rigid, non-folding chassis frame and the dimension reduction to occur in the height of the trailer.

What is needed is a bicycle trailer which is readily collapsible to reduced size when not in use, to permit convenient storage and transportation, yet retains its original chassis frame integrity.

SUMMARY OF THE INVENTION

The present invention provides a collapsible bicycle trailer which meets the aforementioned need.

The collapsible bicycle trailer includes a rigid chassis frame, hinged side rails, a side rail locking bar, a hinged tongue, and quick release wheels.

Accordingly, the collapsible bicycle trailer, in its preferred embodiment, comprises a chassis frame having a generally rectangular-shaped outer frame member, and inner frame members spaced inwardly from, and parallel to, the side of the outer frame member. Wheel axle mounts are attached to each side of the chassis frame, and extend downwards so as to span and receive the hub of quick release bicycle wheels. The two bicycle wheels rotate between the sides of the outer frame member and the inner frame members.

On each side of the chassis frame are positioned a pair of side rail hinge members to which are attached the lower ends of a side rail. The side rails rotate on the side rail hinge members between an extended, vertical position and a folded horizontal position essentially parallel and adjacent to the chassis frame. Each side rail hinge member is provided with a vertical stop which limits the unfolded position of the side rail to the vertical position. The side rail hinge members also are designed to provide the connecting means between the outer frame member and the inner frame members.

Attached to the top of the two side rails are a locking bar hinge member and a locking bar catch member, respectively. A side rail locking bar is pivotally attached to the locking bar hinge member. A locking bar catch member is opposingly positioned on the top of the other side rail, so that, with the two side rails in unfolded vertical positions, the side rail locking bar is rotated upwards to a horizontal position and placed into the recess of the locking bar catch member. A securing pin may be inserted through aligned apertures formed through the end of the side rail locking bar and through the locking bar catch member, so as to secure the side rail locking bar into position. The preferred securing pin has a release guard to prevent inadvertent release. The length of the side rail locking bar is formed so that, when in position, the two side rails are secured apart in a substantially parallel vertical position, firmly against the stops of the side rail hinge members.

Extending forward from a front corner of the chassis frame is a tongue, having at its outer end a hitch for attaching the trailer to a bicycle. A pivot shaft is mounted between the side of the outer frame member and the inner frame member, on supports that extend downward therefrom. The inner end of the tongue preferably is pierced by the shaft and rotates thereon. A U-shaped tongue clip is installed on the outer frame member, proximate the front connection of the outer frame member and the inner frame member, with its opening facing downwards, to grasp and secure the trailer tongue in an open, extended position. A securing pin penetrates the downward extending legs of the tongue clip beneath the tongue to retain the tongue safely in the extended position, although the downward pressure of the weight of the trailer and its contents serves to keep the tongue in that position. When it is desired that the tongue be folded, it may be released from the tongue clip and pivoted 180 degrees to a position beneath and adjacent to the chassis frame.

The tongue is shaped and the outer end of the tongue has an appropriate hitch attached thereto for connection to a bicycle. A preferred hinge is that described in U.S. Pat. No. 4,721,320.

Upon removal of the quick release wheels, disengaging the side rail locking bar and folding it along its hinged side rail, folding the two side rails downward against the chassis frame and folding the tongue with hitch beneath the chassis frame, the collapsible bicycle trailer is folded into a compact package, easily stored or transported in the trunk of an automobile or other vehicle.

DESCRIPTION OF THE PREFERRED EMBODIMENT

Turning now to the drawings, there is shown, in FIGS. 1, 2, 3, 4, and 15, views of the preferred embodiment of the collapsible bicycle trailer 10 in unfolded configuration. The trailer 10 includes a rigid chassis frame 11, composed of a generally rectangular outer frame member 12 and two inner frame members 13 which are attached to the outer frame member 12. The preferred material for outer and inner frame members 12, 13 of the chassis frame 11 is a seamless aluminum tubing 14 of one-inch outside diameter.

Wheel axle mounts 15 are attached on each side 16 of the outer frame member 12 and on the two inner frame members 13 at aligned positions. The wheel axle mounts 15 extend downward so as to span and receive the hub 17 of a bicycle wheel 18, so that the wheel 18 rotates within the chassis frame 11 as shown. Bicycle wheels 18 of the quick release type are preferred, consistent with the objective of a quickly and readily collapsible bicycle trailer 10.

Figure 1:
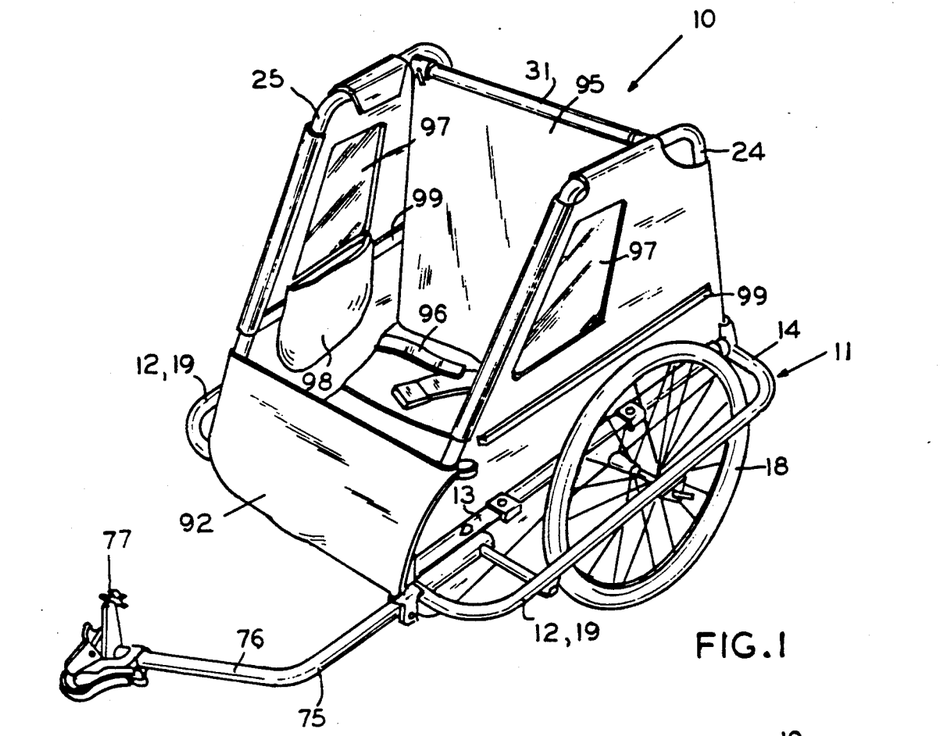
FIG. 1 illustrates a perspective view of a collapsible bicycle trailer, unfolded for use.
Figure 2:
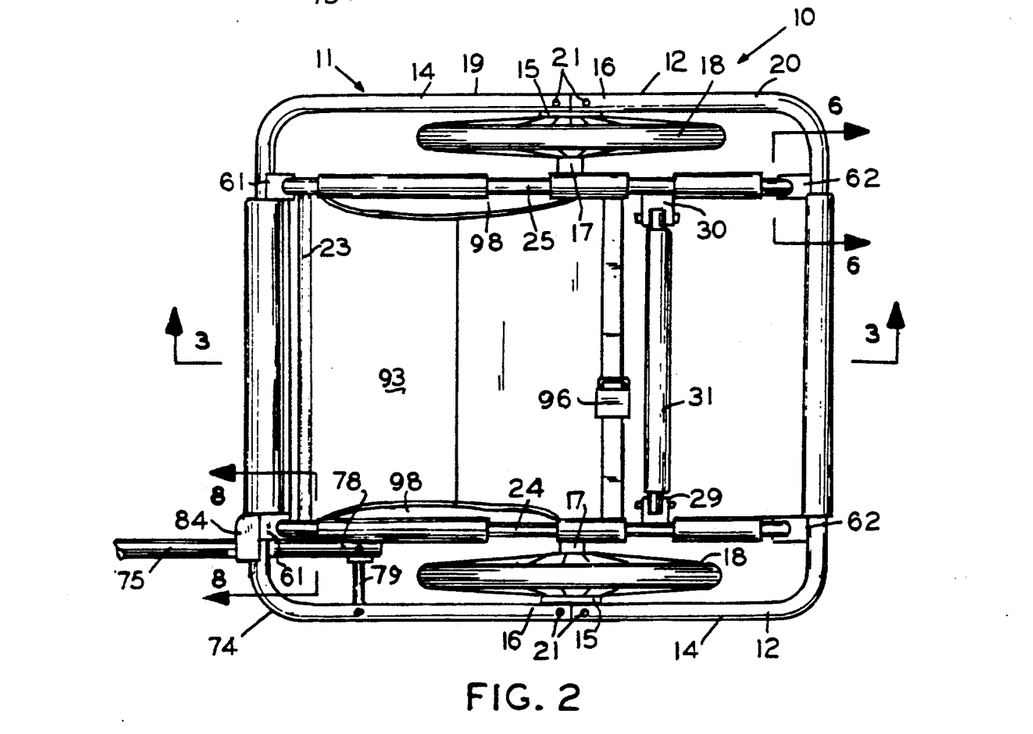
FIG. 2 illustrates a top view of the collapsible bicycle trailer of FIG. 1.
Figure 3:
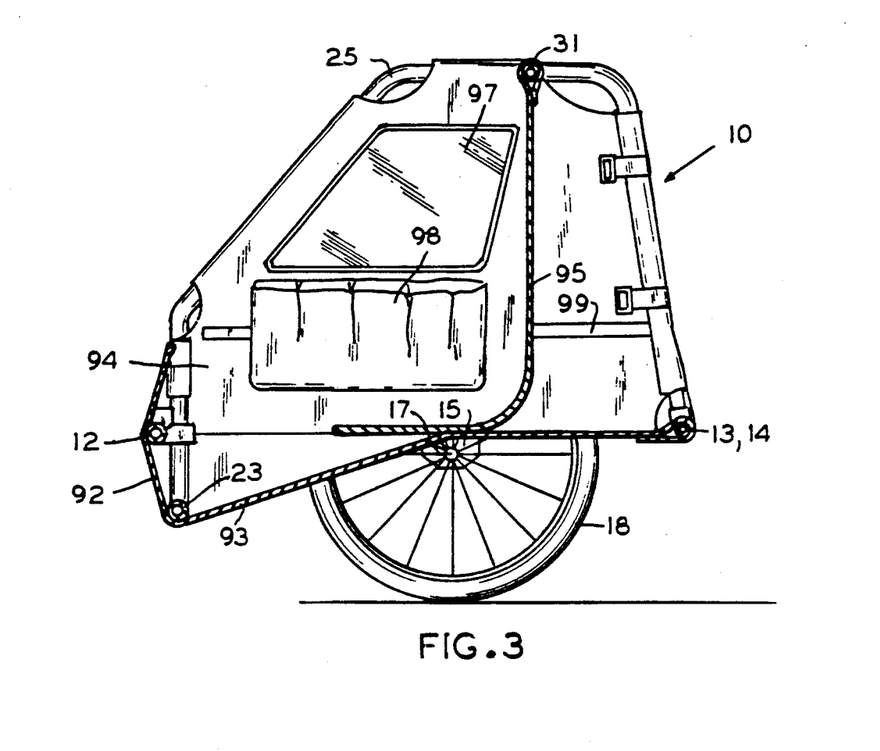
FIG. 3 illustrates a sectional view of the collapsible bicycle trailer, as seen at line 3—3 of FIG. 2.
Figure 4:
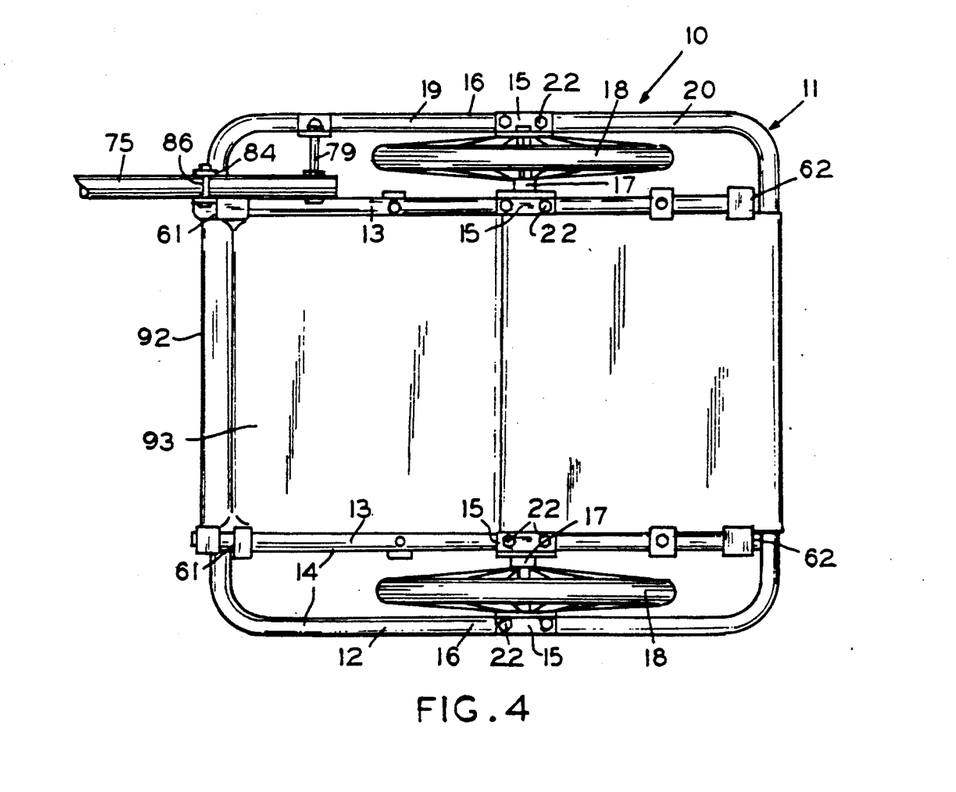
FIG. 4 illustrates a bottom view of the collapsible bicycle trailer of FIG. 1.
Figure 5:
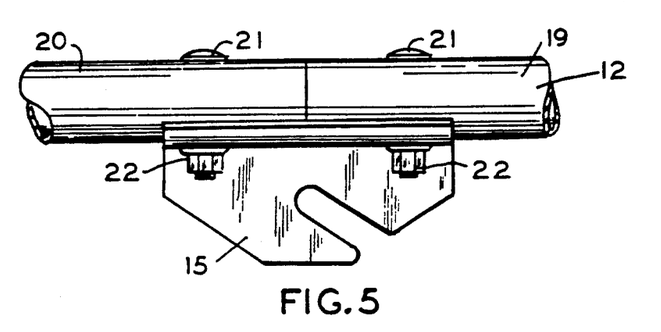
FIG. 5 illustrates a wheel axle mount, as mounted on the outer frame member of the chassis frame.

The outer frame member 12 may be formed in a front section 19 and a rear section 20 which are joined together at the location of the wheel axle mounts 15 on the outer frame member 12. In such case, the means of attachment of the wheel axle mounts 15 to the sections 19 and 20, by bolts 21 and nuts 22, as best seen in FIG. 5, also serves to rigidly join the sections 19 and 20 together to form the complete outer frame member 12.

In the preferred embodiment, an additional U-shaped front frame member 23 may be added, which is joined to the inner frame members 13 and extend downwards to provide a lower front support for additional room within the trailer 10.

Figure 16:
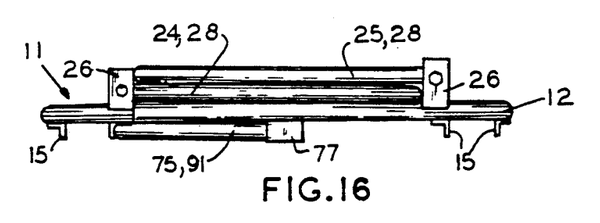
FIG. 16 illustrates a rear side view of the chassis frame, side bars and tongue, as folded in the the collapsible bicycle trailer.

On the sides of the chassis frame 11 are attached side rails 24 and 25. The side rails 24, 25 rotate on side rail hinge members 26, subsequently described in greater detail, between an extended vertical position 27 and a folded horizontal position 28 essentially parallel and adjacent to the chassis frame 11, the latter as best seen in FIG. 16.

Attached to the two side rails 24 and 25 are a locking bar hinge assembly 29 and a locking bar catch assembly 30, respectively, as best seen in FIGS. 11 through 14. The locking bar hinge member 29 is U-shaped, having a base 32 and two extending legs 33. The base 32 is formed with an aperture 34, which when aligned with an aperture 35 formed in the top 36 of the side rail 24, will receive a fastening member 37, a bolt 21 and nut 22 as illustrated, and thus be fixedly attached with the legs 33 extending towards the other side rail 25. A side rail locking bar 31 is pivotally attached to the locking bar hinge member 29 by means of a pivot pin 38 installed between aligned apertures 39 formed through legs 33 of the locking bar hinge member 29, and aperture 40 formed though end 41 of the side rail locking bar 31. A locking bar catch member 30 is cup-shaped, having a base 42 and an enclosing mouth 43. The base 42 is formed with an aperture 44, which when aligned with an aperture 45 formed on the top 46 of the side rail 25 will receive fastening member 47, bolt 21 and nut 22 as illustrated, and thus be fixedly attached with its mouth 43 extending towards side rail 24. Thus, with the two side rails 24 and 25 in unfolded vertical positions 27, the side rail locking bar 31 is rotated upwards to a horizontal position 48 and the free end 49 placed within the mouth 43 of the locking bar catch member 30. Mouth 43 may be formed with an upper segment 50 removed to permit easier insertion and removal of end 49 of the side rail locking bar 31.

A securing pin 51 may be inserted through aligned apertures 52 formed near the end 49 of the side rail locking bar 31 and through the locking bar catch member 30 so as to lock the side rail locking bar 31 into position. The preferred securing pin 51 has a release guard 53 to prevent inadvertant release. The length of the side rail locking bar 31 is formed, so that, when in position, the two side rails 24 and 25 are secured apart in a rigid vertical position, firmly against the vertical stops 71 of the side rail hinge members 26, as described below.

The side rails 24 and 25 and the side rail locking bar 31, formed of ⅞-inch outside diameter aluminum tubing, thus assembled, form a roll bar assembly 54 for the trailer 10, serving to protect its contents should the trailer 10 inadvertantly turn over in use.

Figure 6:
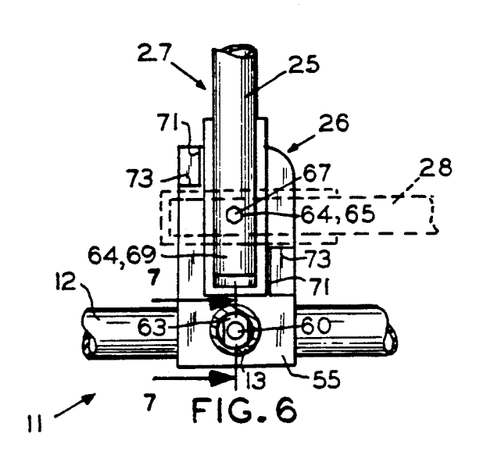
FIG. 6 illustrates a sectional view of a side rail hinge member as seen at line 6—6 of FIG. 2.
Figure 7:
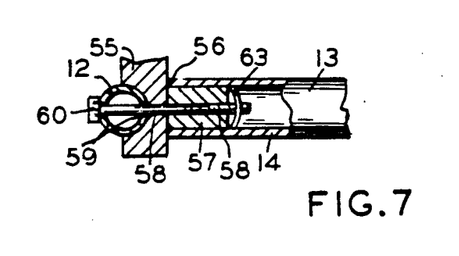
FIG. 7 illustrates a sectional view as seen at line 7—7 of FIG. 6.
Figure 9:
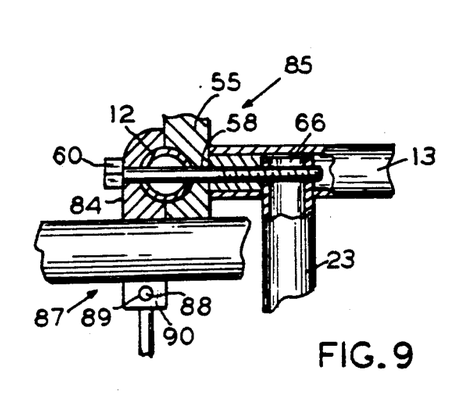
FIG. 9 illustrates a sectional view as seen at line 9—9 of FIG. 8.

The side rail hinge members 26, as best seen at FIG. 6, provide the means for pivotally attaching the side rails 24, 25 to the chassis frame 11 to permit rotation of each side rail 24, 25 between a folded horizontal position 28, substantially parallel to the chassis frame 11, and a vertical extended position 27, substantially perpendicular to the chassis frame 11. The preferred side rail hinge member 26 includes a base 55 formed to attach to the chassis frame 11 between the outer frame member 12 and an end 56 of an inner frame member 13. The base 55 includes a cylindrical extension 57 sized to fit longitudinally within the tubing 14 of the inner frame member 13. As seen in FIG. 7, aperture 58 is formed through base 55, which, when aligned with a corresponding aperture 59 formed in the outer frame member 12, allows a threaded fastening member 60 to penetrate the base 55 and draw against a connecting member, such as a tubing connector 63, affixed within the inner frame 13, so as to pull the inner frame member 13 tightly against the outer frame member 12. Alternatively, as seen in FIG. 9, when the U-shaped front frame member 23 is utilized, the threaded fastening member 60 may attach to the upper end 66 of the front frame member 23, which has penetrated the inner frame member 13, thereby joining both the front frame member 23 to the inner frame member 13 and the inner frame member 13 to the outer frame member 12. When side rail hinge members 26 are installed on opposing front 61 and back 62 locations on the outer frame member 12, the inner frame member 13 is mounted to form the complete chassis frame 11. In accomplishing the side rail 24, 25 pivot movement, each side rail hinge member 26 includes a pivot member 64, inserted through apertures 67 in the ends 68 or 69 of the side rails 24, 25, and connected with the side rail hinge member 26. Also provided, importantly, is a vertical stop 71 which physically blocks and limits the upward extending rotation to the vertical position 27, thus providing rigid stability to the roll bar assembly 54, previously described. Horizontal stops 73 may also be provided, limiting the downward folding rotation 72 of the side rail 24, 25 to a folded horizontal position 28.

Extending forward from a front corner 74 of the chassis frame 11 is a tongue 75, preferably formed of 1¼-inch aluminum tubing. The tongue 75 has at its outer end 76 a hitch 77 for attaching the trailer 10 to a bicycle (not shown). A preferred hitch 77 is that described in U.S. Pat. No. 4,721,320.

Figure 10:
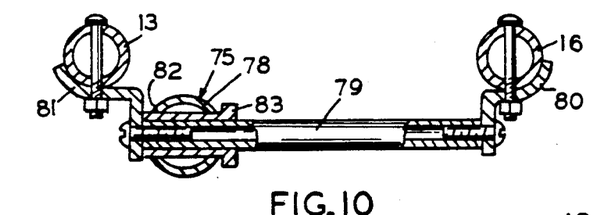
FIG. 10 illustrates a partial sectional view of the pivot mechanism for the trailer tongue.
Figure 11:
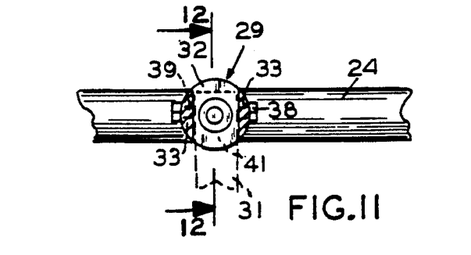
FIG. 11 illustrates a view of the locking bar hinge assembly as seen at line 11—11 of FIG. 15.
Figure 12:
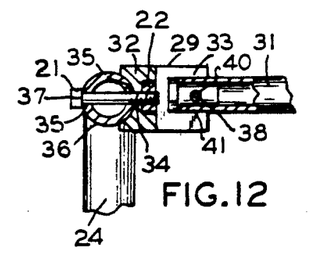
FIG. 12 illustrates a sectional view as seen at line 12—12 of FIG. 11.
Figure 13:
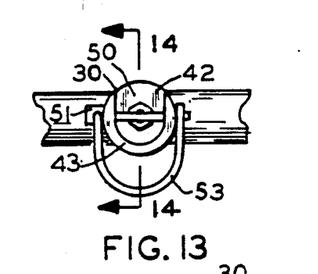
FIG. 13 illustrates a view of the locking bar catch assembly as seen at line 13—13 of FIG. 15.
Figure 14:
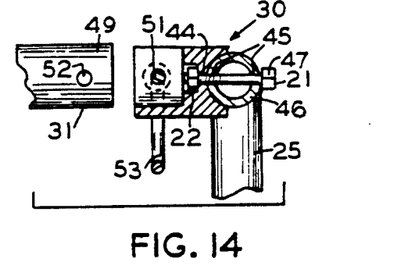
FIG. 14 illustrates a sectional view as seen at line 14—14 of FIG. 13.
Figure 15:
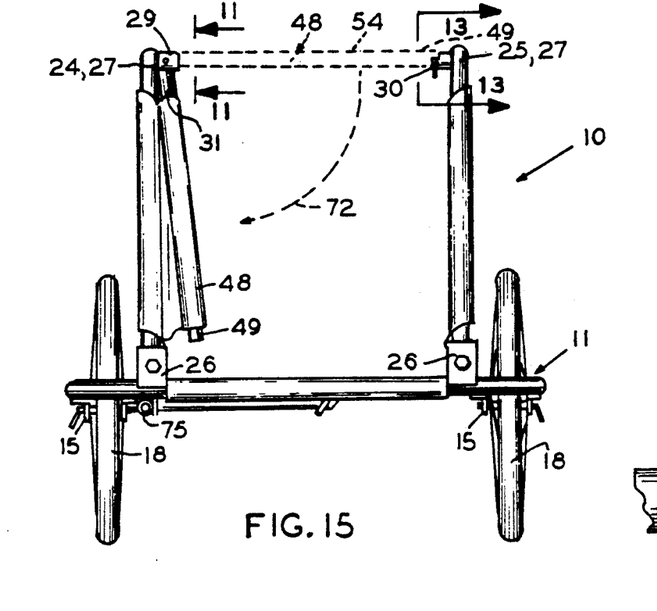
FIG. 15 illustrates a rear side view of the collapsible bicycle trailer frame, showing the manner of folding of the side rails and side rail locking bar.

The inner end 78 of the tongue 75 is pivotally mounted to a pivot shaft 79 mounted between the side 16 of the outer frame member 12 and the inner frame member 13, on supports 80, 81 which extend downward therefrom. The inner end 78 of the tongue 75 preferably is formed with an aperture 82 having a bushing 83 installed therein, so that the bushing 83 and tongue 75 rotate upon the pivot shaft 79.

Figure 8:
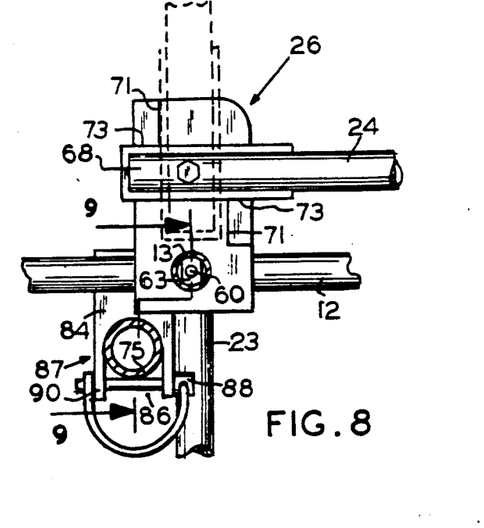
FIG. 8 illustrates a sectional view of a side rail hinge member and tongue clip, as seen at line 8—8 of FIG. 2.

A U-shaped tongue clip 84 is attached on the outer frame member 12 proximate a front connection 85 of the outer frame member 12 and the inner frame member 13; the attachment may utilize fastening member 60, as previously described. The tongue clip 84 has its preferably U-shaped opening 86 facing downwards to grasp and secure the tongue 75 in its extended position 87, as seen in FIG. 8. A securing pin 88 penetrates apertures 89 through the downward extending legs 90 of the tongue clip 84 beneath the tongue 75 in its extended position 87, although the downward pressure of the weight of the trailer 10 and contents serves to keep the tongue 75 in extended position 87. When it is desired that the tongue 75 be folded, it may be released from the tongue clip 84 and pivoted 180-degrees to a position 91 beneath and adjacent the chassis frame 11.

A covering 92, preferably of a tough, durable nylon material, is attached to the chassis frame 11, side rails 24, 25, and side rail locking bar 31, as illustrated, to form the trailer floor 93, side panels 94, and child's seat 95. A safety belt 96 may be provided. The side panels 94 may include clear plastic windows 97, side pockets 98, and longitudinal reinforcing bars 99. An additional top cover (not shown) may be utilized to provide protection from sun or rain.

Upon removal of the quick release bicycle wheels 18, and disengaging the side rail locking bar 31 from the locking bar catch member 30 and folding it along its hinged side rail 24, then folding the side rails 24 and 25 downward against the chassis frame 11, and disengaging the tongue 75 from the tongue clip 84 and folding the tongue 75 with hitch 77 beneath the chassis frame 11, the collapsible bicycle trailer 10 may be folded into a compact package, as seen in FIG. 16, which is easily stored or transported in an automobile or other vehicle.

It is thought that the collapsible bicycle trailer of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

We claim:

1. A collapsible bicycle trailer, comprising:
   a. a chassis frame, having a front, a rear and two sides, including:
      (1) a generally rectangular-shaped outer frame member;
      (2) two inner frame members, attached to the outer frame member, being inwardly located within the plane of the chassis frame and parallel to the two sides thereof;
   b. wheel axle mounts attached to the sides of the chassis frame so as to provide a location for the attachment of two wheels having a plane of rotation between the outer frame member and the inner frame members;
   c. two side rails, a first side rail and a second side rail, generally U-shaped;
   d. means for pivotally attaching the side rails to the chassis frame, to permit rotation of each side rail between a folded position substantially parallel to the chassis frame and an extended position substantially perpendicular to the chassis frame, which include a side rail hinge member having:
      (1) a base formed to attach to the chassis frame between the outer frame member and an end of an inner frame member, said base including:
         (a) a cylindrical extension sized to fit longitudinally within the end of said inner frame member;
         (b) an aperture, extending through said base of the side rail hinge member, said aperture being aligned with a corresponding aperture formed in said outer frame member;
         (c) so that a threaded fastening member, passing through said outer frame member aperture and said base aperture into a connector affixed within the inner frame member, secures said base of the side rail hinge member tightly against said outer frame member, thereby fixing the position of said base relative to the outer frame member and providing, by the cylindrical extension, a rigid protrusion upon which the inner frame member may be mounted;
      (2) a pivot member about which an end of a side rail is attached and rotates; and
      (3) a vertical stop which limits the upward extending rotation to a vertical position;
   e. means for retaining the side rails in the extended position;
   f. a tongue; and
   g. means for pivotally attaching the tongue to the chassis frame, to permit rotation of the tongue between a folded position, substantially parallel and adjacent to the chassis frame and an extended position to the front of the chassis frame.

2. A collapsible bicycle trailer, comprising:
   a. a chassis frame, having a front, a rear and two sides, including:
      (1) a generally rectangular-shaped outer frame member;
      (2) two inner frame members, attached to the outer frame member, being inwardly located within the plane of the chassis frame and parallel to the two sides thereof;
   b. wheel axle mounts attached to the sides of the chassis frame so as to provide a location for the attachment of two wheels having a plane of rotation between the outer frame member and the inner frame members;
   c. two side rails, a first side rail and a second side rail, generally U-shaped;
   d. means for pivotally attaching the side rails to the chassis frame, to permit rotation of each side rail between a folded position, substantially parallel to the chassis frame and an extended position, substantially perpendicular to the chassis frame;

e. means for retaining the side rails in the extended position;
f. a tongue;
g. means for pivotally attaching the tongue to the chassis frame, to permit rotation of the tongue between a folded position, substantially parallel and adjacent to the chassis frame, and an extended position to the front of the chassis frame; and
h. means for securing the tongue in the extended position to the chassis frame, so that the tongue may be locked in the extended position, which include:
  (1) a U-shaped tongue clip, attached to the chassis frame proximate a front connection of the outer frame member and inner frame member, and located toward the front of the chassis frame from the means for pivotally attaching the tongue to the chassis frame;
  (2) said tongue clip having an opening between two legs facing downwards and being formed to embrace the tongue in the tongue's unfolded, extended position; and
  (3) a securing pin which penetrates the two legs of the U-shaped clip, through apertures formed therein which are located beneath an extended tongue, so as to retain the tongue in the unfolded extended position within the tongue clip.

3. The collapsible bicycle trailer, as recited in claim 2, wherein the means for pivotally attaching the tongue to the chassis frame includes a pivot shaft assembly, mounted between a side of the outer frame member and an inner frame member proximate the front of the chassis frame, said pivot shaft assembly offset from the chassis frame formed to permit 180-degree rotation of the tongue between the unfolded extended position and the folded position.

4. The collapsible bicycle trailer, as recited in claim 2, wherein the tongue is formed, with a hitch member attached at the outer end thereof, to permit connection to a towing bicycle.

5. A collapsible bicycle trailer, comprising:
a. a chassis frame, having a front, a rear and two sides, including:
  (1) a generally rectangular-shaped outer frame member;
  (2) two inner frame members, attached to the outer frame member, being inwardly located within the plane of the chassis frame and parallel to the two sides thereof;
b. wheel axle mounts attached to the sides of the chassis frame so as to provide a location for the attachment of two wheels having a plane of rotation between the outer frame member and the inner frame members;
c. two side rails, a first side rail and a second side rail, generally U-shaped;
d. means for pivotally attaching the side rails to the chassis frame, to permit rotation of each side rail between a folded position, substantially parallel to the chassis frame and an extended position, substantially perpendicular to the chassis frame;
e. means for retaining the side rails in the extended position which include:
  (1) a side rail locking bar, having a first end and a second end;
  (2) means for pivotally attaching the first end of the side rail locking bar to the first side rail to permit rotation of said side rail locking bar between a folded position, substantially parallel and adjacent to the plane of the first side rail, and an extended position substantially perpendicular to the plane of the first side rail, wherein said means for pivotally attaching the first end of the side rail locking bar to the first side rail include:
    (a) a locking bar hinge assembly, formed in a U-shape, and having a base and two extending legs, the base having an aperture which, when aligned with a corresponding horizontal aperture formed in the top of the first side rail when extended to the vertical, will receive a fastening member and thereby be fixedly attached to the first side rail with the legs of the locking bar hinge assembly extending horizontally towards an opposing position on the second side rail; and
    (b) a pivot pin installed through aligned apertures formed through the legs of the locking bar hinge assembly and through the first end of the side rail locking bar;
  (3) means for securing the second end of the side rail locking bar to the second side rail, so that with the first and second side rails both in extended vertical positions, and the side rail locking bar in a secured extended position, the side rail locking bar will maintain the first and second side rails in a substantially parallel position relative to each other, and will itself be spaced from and substantially parallel to the chassis frame;
f. a tongue; and
g. means for pivotally attaching the tongue to the chassis frame, to permit rotation of the tongue between a folded position, substantially parallel and adjacent to the chassis frame and an extended position to the front of the chassis frame.

6. A collapsible bicycle trailer, comprising:
a. a chassis frame, having a front, a rear and two sides, including:
  (1) a generally rectangular-shaped outer frame member;
  (2) two inner frame members, attached to the outer frame member, being inwardly located within the plane of the chassis frame and parallel to the two sides thereof;
b. wheel axle mounts attached to the sides of the chassis frame so as to provide a location for the attachment of two wheels having a plane of rotation between the outer frame member and the inner frame members;
c. two side rails, a first side rail and a second side rail, generally U-shaped;
d. means for pivotally attaching the side rails to the chassis frame, to permit rotation of each side rail between a folded position, substantially parallel to the chassis frame and an extended position, substantially perpendicular to the chassis frame;
e. means for retaining the side rails in the extended position which include:
  (1) a side rail locking bar, having a first end and a second end;
  (2) means for pivotally attaching the first end of the side rail locking bar to the first side rail to permit rotation of said side rail locking bar between a folded position, substantially parallel and adjacent to the plane of the first side rail, and an extended position substantially perpendicular to the plane of the first side rail; and (3) means for securing the second end of the side rail locking bar to the second side rail, so that with the first and second side rails both in extended vertical positions, and the side rail locking bar in a secured extended position, the side rail locking bar will maintain the first and second side rails in a substantially parallel position relative to each other, and will itself be spaced from and substantially parallel to the chassis frame, wherein said means for securing the second end of the side rail locking bar to the second side rail include:

(a) a locking bar catch assembly formed to be cup-shaped, having a base and a enclosing mouth, with the base having an aperture which, when aligned with a corresponding horizontal aperture in the top of the second side rail when vertically extended, will receive a fastening member and thereby be fixedly attached with the mouth opening extending horizontally towards the means for pivotally attaching the first end of the side rail locking bar to the first side rail, which is opposingly positioned on the first side rail; and     (b) a securing pin installed between aligned apertures formed through the sides of the mouth of the locking bar catch member and through the second end of the side rail locking bar;

f. a tongue; and g. means for pivotally attaching the tongue to the chassis frame, to permit rotation of the tongue between a folded position, substantially parallel and adjacent to the chassis frame and an extended position to the front of the chassis frame.

7. The collapsible bicycle trailer, as recited in claim 6, wherein the locking bar catch assembly is formed with an upper segment of the side of its mouth omitted to permit easier insertion and removal of the second end of the side rail locking bar therein.

8. A collapsible bicycle trailer, comprising:

a. a chassis frame, having a front, a rear and two sides, including:

(1) a generally rectangular-shaped outer frame member;

(2) two inner frame members, attached to the outer frame member, being inwardly located within the plane of the chassis frame and parallel to the two sides thereof;

b. wheel axle mounts attached to the sides of the chassis frame so as to provide a location for the attachment of two wheels having a plane of rotation between the outer frame member and the inner frame members;

c. two side rails, a first side rail and a second side rail, generally U-shaped;

d. means for pivotally attaching the side rails to the chassis frame, to permit rotation of each side rail between a folded position, substantially parallel to the chassis frame and an extended position, substantially perpendicular to the chassis frame; said means including a side rail hinge member having:

(1) a base formed to attach to the chassis frame between the outer frame member and an end of an inner frame member, said base including:

(a) a cylindrical extension sized to fit longitudinally within the end of said inner frame member;

(b) an aperture, extending through said base of the side rail hinge member, which aperature is aligned with a corresponding aperture formed in said outer frame member;

(c) so that a threaded fastening member, passing through said outer frame member aperture and said base aperture into a connector affixed within the inner frame member, secures said base of the side rail hinge member tightly against said outer frame member, thereby fixing the position of said base relative to the outer frame member and providing, by the cylindrical extension, a rigid protrusion upon which the inner frame member may be mounted;

(2) a pivot member about which an end of a side rail is attached and rotates;

(3) a vertical stop which limits the upward extending rotation to a vertical position;

e. a tongue formed, with a hitch member attached at the outer end thereof, to permit connection to a towing bicycle;

f. means for pivotally attaching the tongue to the chassis frame, to permit rotation of the tongue between a folded position, substantially parallel and adjacent to the chassis frame and an extended position to the front of the chassis frame, said means including a pivot shaft assembly, mounted between a side of the outer frame member and an inner frame member proximate the front of the chassis frame, said pivot shaft assembly offset from the chassis frame to permit 180-degree rotatIon of the tongue between the unfolded extended position and the folded position;

g. means for securing the tongue to the chassis frame in the extended position, so that the tongue may be locked in the extended position, including:

(1) a U-shaped tongue clip, attached to the chassis frame proximate a front connection of the outer frame member and inner frame member, and located toward the front of the chassis frame from the means for pivotally attaching the tongue to the chassis frame;

(2) said tongue clip having an opening between two legs facing downwards and being formed to embrace the tongue in the tongue's unfolded, extended position;

(3) a securing pin which penetrates the two legs of the U-shaped clip, through apertures formed therein, located beneath an extended tongue, so as to retain the tongue in the unfolded extended position within the tongue clip.

h. a side rail locking bar, having a first end and a second end;

i. means for pivotally attaching the first end of the side rail locking bar to the first side rail to permit rotation of said side rail locking bar between a folded position, substantially parallel to and located within the plane of the first side rail, and an extended position substantially perpendicular to the plane of the first side rail which include:

(1) a locking bar hinge assembly, formed in a U-shape, and having a base and two extending legs, the base having an aperture which, where aligned with a corresponding horizontal aperture formed in the top of the first side rail when extended to the vertical, will receive a fastening member and thereby be fixedly attached to the first side rail with the legs of the locking bar hinge assembly extending horizontally towards an opposing position on the second side rail;
   (2) a pivot pin installed through aligned apertures formed through the legs of the locking bar hinge assembly and through the first end of the side rail locking bar;
j. means for securing the second end of the side rail locking bar to the second side rail, so that with the first and second side rails both in extended vertical positions, and the side rail locking bar also in extended position, the side rail locking bar will maintain the first and second side rails in a substantially parallel position relative to each other, and will itself be substantially parallel to the chassis frame, said means including:
   (1) a locking bar catch assembly formed to be cup-shaped, having a base and a enclosing mouth, with the base having an aperture which, when aligned with a corresponding horizontal aperture in the top of the second side rail when vertically extended, will receive a fastening member and thereby be fixedly attached with the mouth opening extending horizontally towards the locking bar hinge assembly opposingly positioned on the first side rail; the cup member being formed with an upper segment of the side of its mouth omitted to permit easier insertion and removal of the second end of the locking bar therein; and
   (2) a securing pin installed between aligned apertures formed through the sides of the mouth of the locking bar catch member and through the second end of the side rail locking bar.

* * * * *